(12) United States Patent  
Miyanari et al.

(10) Patent No.: US 11,557,759 B2  
(45) Date of Patent: Jan. 17, 2023

(54) NONAQUEOUS ELECTROLYTE SECONDARY BATTERY

(71) Applicant: SANYO Electric Co., Ltd., Daito (JP)

(72) Inventors: Mitsunori Miyanari, Osaka (JP); Syunsuke Natsumeda, Osaka (JP); Kei Kobayashi, Osaka (JP); Atsushi Mizawa, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 277 days.

(21) Appl. No.: 16/954,303

(22) PCT Filed: Dec. 6, 2018

(86) PCT No.: PCT/JP2018/044816  
§ 371 (c)(1),  
(2) Date: Jun. 16, 2020

(87) PCT Pub. No.: WO2019/131030  
PCT Pub. Date: Jul. 4, 2019

(65) Prior Publication Data  
US 2021/0091381 A1 Mar. 25, 2021

(30) Foreign Application Priority Data  
Dec. 28, 2017 (JP) .............................. JP2017-253429

(51) Int. Cl.  
*H01M 4/48* (2010.01)  
*H01M 4/36* (2006.01)  
(Continued)

(52) U.S. Cl.  
CPC ........... *H01M 4/483* (2013.01); *H01M 4/364* (2013.01); *H01M 10/0525* (2013.01); *H01M 10/0587* (2013.01); *H01M 2004/027* (2013.01)

(58) Field of Classification Search  
CPC .. H01M 4/483; H01M 4/364; H01M 10/0525; H01M 10/0587; H01M 2004/027  
See application file for complete search history.

(56) References Cited

U.S. PATENT DOCUMENTS

| 2011/0076534 A1 | 3/2011 | Kobayashi et al. |
| 2017/0338463 A1 | 11/2017 | Sugaya et al. |

FOREIGN PATENT DOCUMENTS

| JP | 2010-212228 A | 9/2010 |
| JP | 2011-91020 A | 5/2011 |

(Continued)

OTHER PUBLICATIONS

International Search Report dated Mar. 5, 2019, issued in counterpart application No. PCT/JP2018/044816, with English translation. (4 pages).

*Primary Examiner* — Jane J Rhee  
(74) *Attorney, Agent, or Firm* — WHDA, LLP

(57) ABSTRACT

A nonaqueous electrolyte secondary battery using a silicon compound as a negative electrode active material, suppress deformation of a negative electrode. An embodiment includes a winding type electrode body in which a positive electrode and a negative electrode are spirally wound with at least one separator interposed therebetween. In a negative electrode mixture layer, a silicon compound is contained as a negative electrode active material. A winding-start side end of the negative electrode mixture layer extends to a winding-start end side of the electrode body past a winding-start side end of a positive electrode mixture layer. A length Y (mm) of a portion of the negative electrode mixture layer extending from the winding-start side end of the positive electrode mixture layer and a rate X (percent by mass) of the silicon compound with respect to the total mass of the negative electrode active material satisfy a relationship of $Y \geq 3X-15$ ($6 \leq X \leq 15$).

2 Claims, 4 Drawing Sheets

(51) Int. Cl.
*H01M 10/0525* (2010.01)
*H01M 10/0587* (2010.01)
*H01M 4/02* (2006.01)

(56) References Cited

FOREIGN PATENT DOCUMENTS

| | | |
|---|---|---|
| JP | 2014-123485 A | 7/2014 |
| JP | 2015-185491 A | 10/2015 |
| WO | 2016/103656 A1 | 6/2016 |

NONAQUEOUS ELECTROLYTE SECONDARY BATTERY

TECHNICAL FIELD

The present disclosure relates to a nonaqueous electrolyte secondary battery.

BACKGROUND ART

It has been known that, compared to a carbon-based material such as graphite, a silicon compound, such as a silicon oxide represented by $SiO_x$, is able to occlude a large amount of lithium ions per unit volume. For example, PTL 1 has disclosed a nonaqueous electrolyte secondary battery using a silicon compound as a negative electrode active material. In the battery disclosed in PTL 1, as the negative electrode active material, a silicon compound and graphite are used in combination.

CITATION LIST

Patent Literature

PTL 1: Japanese Published Unexamined Patent Application No. 2010-212228

SUMMARY OF INVENTION

Technical Problem

Incidentally, since a silicon compound has a large volume expansion caused by insertion of lithium ions as compared to that of graphite, when the silicon compound is used as a negative electrode active material, a strain stress is liable to be generated in a negative electrode. In particular, when a rate of the silicon compound in the negative electrode active material is increased, a large strain stress is applied to the negative electrode, and the negative electrode may be deformed in some cases. In addition, by an influence of the deformation of the negative electrode, a positive electrode and a separator may also be deformed in some cases.

In a nonaqueous electrolyte secondary battery using a silicon compound as a negative electrode active material, the present disclosure aims to suppress the deformation of a negative electrode.

Solution to Problem

A nonaqueous electrolyte secondary battery according to one aspect of the present disclosure is a nonaqueous electrolyte secondary battery which comprises: a winding type electrode body in which a positive electrode including a positive electrode mixture layer and a negative electrode including a negative electrode mixture layer are spirally wound with at least one separator interposed therebetween. According to the nonaqueous electrolyte secondary battery described above, in the negative electrode mixture layer, a silicon compound is contained as a negative electrode active material; a winding-start side end of the negative electrode mixture layer extends to a winding-start end side of the electrode body past a winding-start side end of the positive electrode mixture layer; and a length Y (mm) of a portion of the negative electrode mixture layer extending from the winding-start side end of the positive electrode mixture layer and a rate X (percent by mass) of the silicon compound with respect to the total mass of the negative electrode active material satisfy a relationship of $Y \geq 3X-15$ ($6 \leq X \leq 15$).

Advantageous Effects of Invention

According to the aspect of the present disclosure, in the nonaqueous electrolyte secondary battery using a silicon compound as the negative electrode active material, the deformation of the negative electrode can be suppressed.

DESCRIPTION OF EMBODIMENTS

As described above, since a silicon compound has a large volume expansion by insertion of lithium ions, when the silicon compound is used as a negative electrode active material, a strain stress is liable to be generated in a negative electrode. When the negative electrode is deformed, a risk to cause an internal short circuit is increased; hence, to suppress the deformation of the negative electrode is an important subject. In addition, since the negative electrode is generally formed one size larger than a positive electrode, a portion (non-facing portion) not facing the positive electrode is present at a winding-start side end portion of the negative electrode of a winding type electrode body. Although a negative electrode mixture layer is volume-expanded by charge at a facing portion of the negative electrode facing the positive electrode, the negative electrode mixture layer at the non-facing portion is not volume-expanded by charge. Hence, the non-facing portion is pulled by a stress of the facing portion, and a strain stress is applied to the non-facing portion. It is believed that since this strain stress is concentrated on a width-direction central portion of the non-facing portion, in particular, on a boundary between the facing portion and the non-facing portion, the negative electrode is deformed at this width-direction central portion.

Through intensive research carried out by the present inventors to overcome the problem described above, it was found that when a length Y from a winding-start side end of a positive electrode mixture layer to a winding-start side end of the negative electrode mixture layer and a rate X of the silicon compound with respect to the total mass of the negative electrode active material satisfy a relationship of $Y \geq 3X-15$ ($6 \leq X \leq 15$), the strain stress at the non-facing portion of the negative electrode can be dispersed, and the deformation of the negative electrode can be suppressed. It is believed that when the relationship of $Y \geq 3X-15$ ($6 \leq X \leq 15$) is satisfied, the strain stress applied to the non-facing portion of the negative electrode is dispersed, and hence, the deformation of the negative electrode is suppressed.

Hereinafter, one example of the embodiment of the present disclosure will be described in detail. In the following description, although a cylindrical battery in which a winding type electrode body 14 is received in a cylindrical battery case 15 will be described by way of example, the battery case is not limited to a cylindrical case and may be, for example, a square case or a battery case formed from a laminate sheet which contains at least one metal layer and at least one resin layer. In the present specification, for the convenience of illustration, a sealing body 17 side of the battery case 15 is described as "upper (side)", and a bottom portion side of an exterior package can 16 will be described as "lower (side)".

Figure 1:
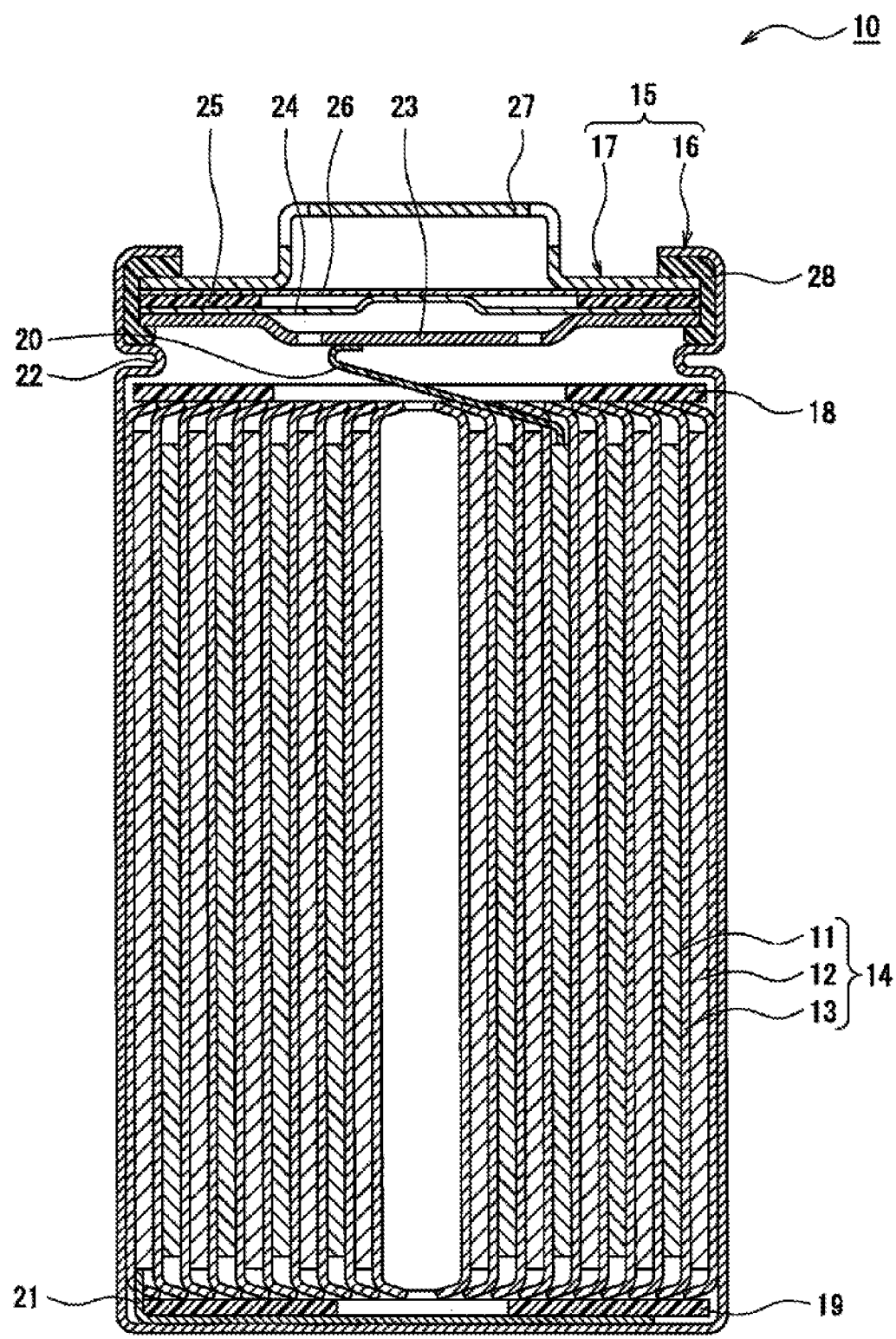
FIG. 1 is a longitudinal direction cross-sectional view of a nonaqueous electrolyte secondary battery according to one example of an embodiment.

FIG. 1 is a longitudinal direction (axial direction) cross-sectional view of a nonaqueous electrolyte secondary battery 10 according to one example of the embodiment. As shown in FIG. 1 by way of example, the nonaqueous electrolyte secondary battery 10 includes an electrode body 14, a nonaqueous electrolyte (not shown), and a battery case 15 which receives the electrode body 14 and the nonaqueous electrolyte. The electrode body 14 has a winding structure in which a positive electrode 11 and a negative electrode 12 are spirally wound with at least one separator 13 interposed therebetween. The battery case 15 is formed of a bottom-closed exterior package can 16 and a sealing body 17 which seals an opening portion of the exterior package can 16. In addition, the nonaqueous electrolyte secondary battery 10 also includes a resin-made gasket 28 disposed between the exterior package can 16 and the sealing body 17.

The nonaqueous electrolyte contains a nonaqueous solvent and an electrolyte salt dissolved in the nonaqueous solvent. As the nonaqueous solvent, for example, there may be mentioned an ester, an ether, a nitrile, an amide, or a mixed solvent containing at least two of those mentioned above. The nonaqueous solvent may also include a halogen substituent in which at least one hydrogen atom of each of those solvents mentioned above is replaced by a halogen atom, such as fluorine. In addition, the nonaqueous electrolyte is not limited to a liquid electrolyte, and a solid electrolyte using a gel polymer or the like may also be used. As the electrolyte salt, for example, a lithium salt, such as $LiPF_6$, is used.

The electrode body 14 is formed of a long positive electrode 11, a long negative electrode 12, two long separators 13, a positive electrode tab 20 bonded to the positive electrode 11, and a negative electrode tab 21 bonded to the negative electrode 12. In order to prevent precipitation of lithium, the negative electrode 12 is formed one size larger than the positive electrode 11. That is, the negative electrode 12 is formed longer than the positive electrode 11 in a longitudinal direction and in a width direction (short direction). The two separators 13 are each formed at least one size larger than the positive electrode 11, for example, so as to sandwich the positive electrode 11.

In this embodiment, the positive electrode tab 20 is provided at a central portion of the positive electrode 11 in a longitudinal direction and at a position apart from a winding-start side end portion and a winding-finish side end portion of the electrode body 14. On the other hand, the negative electrode tab 21 is provided at one end portion of the negative electrode 12 in a longitudinal direction which is located at a winding-finish side of the electrode body 14.

On the top and the bottom of the electrode body 14, insulating plates 18 and 19 are disposed, respectively. In the example shown in FIG. 1, the positive electrode tab 20 fitted to the positive electrode 11 extends to a sealing body 17 side through a through-hole of the insulating plate 18, and the negative electrode tab 21 fitted to the negative electrode 12 extends to a bottom portion side of the exterior package can 16 along the outside of the insulating plate 19. The positive electrode tab 20 is connected to a bottom surface of a filter 23 functioning as a bottom plate of the sealing body 17 by welding or the like, and a cap 27 functioning as a top plate of the sealing body 17 electrically connected to the filter 23 is used as a positive electrode terminal. The negative electrode tab 21 is connected to an inner surface of the bottom portion of the exterior package can 16 by welding or the like, and the exterior package can 16 is used as a negative electrode terminal.

The exterior package can 16 is, for example, a bottom-closed cylindrical metal-made container. As described above, between the exterior package can 16 and the sealing body 17, the gasket 28 is provided, and an inner space of the battery case 15 is sealed. The exterior package can 16 has a groove portion 22 to support the sealing body 17, the groove portion being formed, for example, by pressing a side surface portion from the outside. The groove portion 22 is preferably formed to have a ring shape along a circumferential direction of the exterior package can 16, and an upper surface of the groove portion 22 supports the sealing body 17. In addition, an upper end portion of the exterior package can 16 is bent inside and is caulked with a circumferential portion of the sealing body 17.

The sealing body 17 has the structure in which the filter 23, a lower valve 24, an insulating member 25, an upper valve 26, and the cap 27 are laminated in this order from an electrode body 14 side. The members forming the sealing body 17 each have, for example, a disc shape or a ring shape and are electrically connected to each other except for the insulating member 25. The lower valve 24 and the upper valve 26 are connected to each other at the central portions thereof, and between the peripheral portions thereof, the insulating member 25 is provided. When an inside pressure of the battery is increased by abnormal heat generation, since the lower valve 24 is deformed so as to push up the upper valve 26 toward a cap 27 side and is fractured, an electric current path between the lower valve 24 and the upper valve 26 is interrupted. When the inside pressure is further increased, the upper valve 26 is fractured, and a gas is exhausted from an opening portion of the cap 27.

Figure 2:
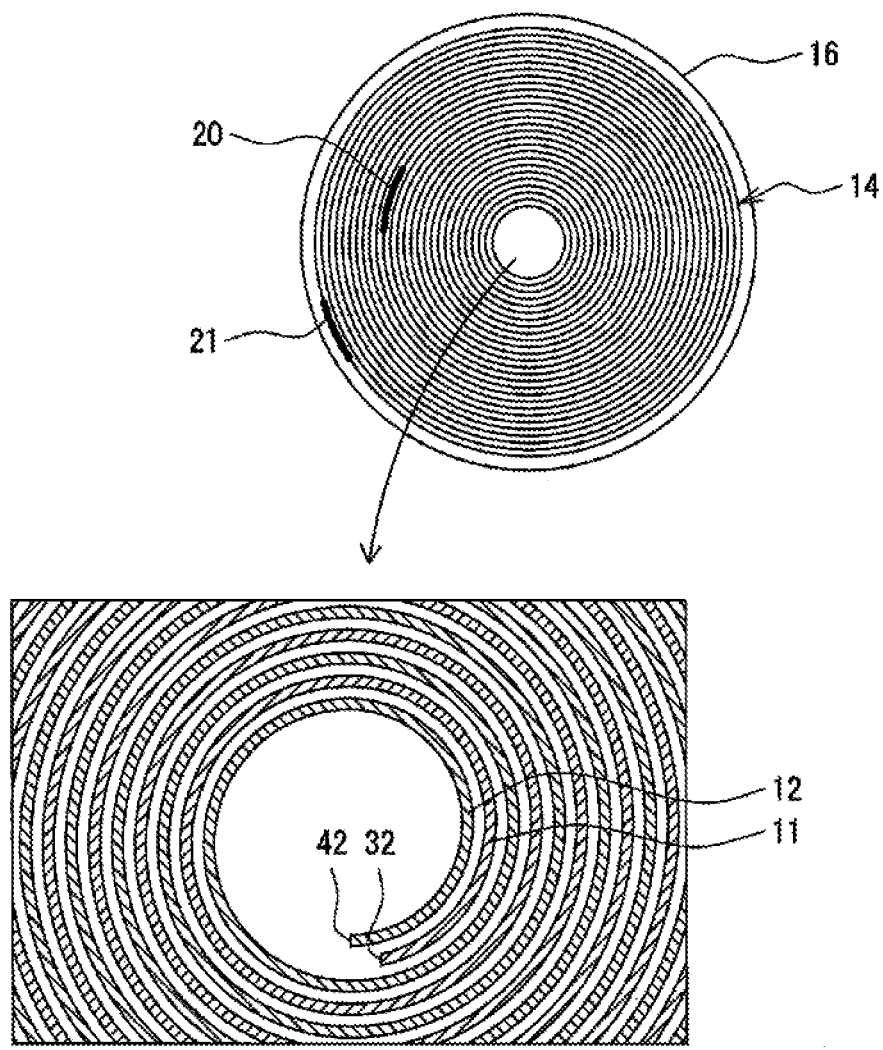
FIG. 2 is a lateral direction cross-sectional view partially showing an electrode body according to one example of the embodiment.
Figure 3:
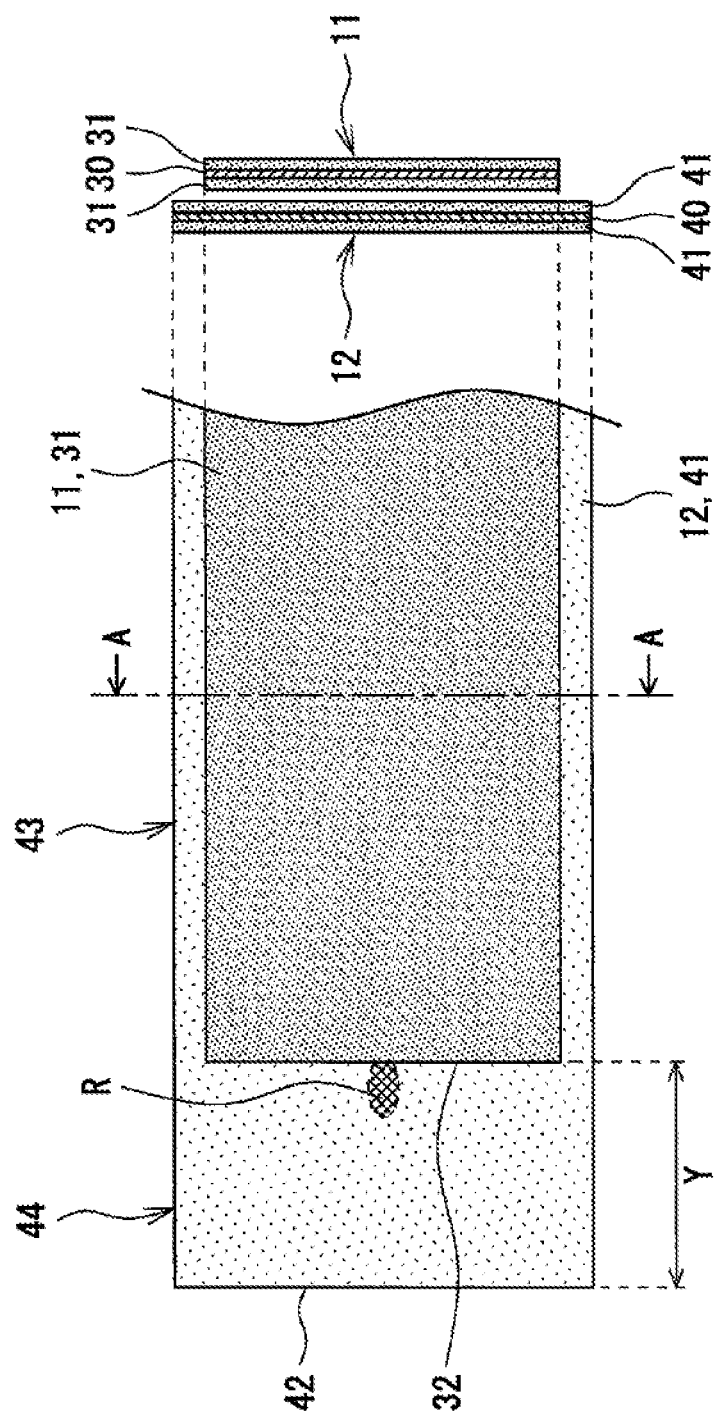
FIG. 3 is a view showing a positive electrode and a negative electrode according to one example of the embodiment.

Hereinafter, with appropriate reference to FIGS. 2 and 3, the electrode body 14 will be described in detail. FIG. 2 is a lateral direction (radius direction) cross-sectional view showing the winding-start side end portion of the electrode body 14 and the vicinity thereof. FIG. 3 is a view showing winding-start side end portions of the positive electrode 11 and the negative electrode 12 forming the electrode body 14. In FIGS. 2 and 3, the separators 13 are omitted.

[Positive Electrode]

As shown in FIGS. 2 and 3, the positive electrode 11 includes a belt-shaped positive electrode collector 30 and positive electrode mixture layers 31 formed on two surfaces of the positive electrode collector 30. For the positive electrode collector 30, for example, foil made from a metal, such as aluminum, stable in a potential range of the positive electrode 11 or a film having a surface layer formed of the metal mentioned above may be used. The positive electrode mixture layer 31 contains a positive electrode active material, an electrically conductive agent, and a binding agent. The positive electrode 11 can be formed, for example, such that after a positive electrode mixture slurry containing the positive electrode active material, the electrically conductive agent, the binding agent, and the like is applied to the positive electrode collector 30, coating films thus formed are dried and then pressed to form the positive electrode mixture layers 31 on the two surfaces of the positive electrode collector 30.

The positive electrode active material is composed of a lithium metal composite oxide as a primary component. As a metal element contained in the lithium metal composite oxide, for example, there may be mentioned Ni, Co, Mn, Al, B, Mg, Ti, V, Cr, Fe, Cu, Zn, Ga, Sr, Zr, Nb, In, Sn, Ta, or W. A preferable example of the lithium metal composite oxide is a composite oxide containing at least one of Ni, Co, Mn, and Al. In addition, onto particle surfaces of the lithium metal composite oxide, inorganic compound particles of aluminum oxide, a lanthanoid-containing compound, or the like may be tightly fixed.

As the electrically conductive agent contained in the positive electrode mixture layer 31, for example, there may be mentioned a carbon material, such as carbon black, acetylene black, Ketjen black, or graphite. As the binding agent contained in the positive electrode mixture layer 31, for example, there may be mentioned a fluorine resin, such as a polytetrafluoroethylene (PTFE) or a poly(vinylidene fluoride) (PVdF), a polyacrylonitrile (PAN), a polyimide resin, an acrylic resin, or a polyolefin resin. Those resins each may be used together with a cellulose derivative, such as a carboxymethyl cellulose (CMC) or its salt, or a polyethylene oxide (PEO).

[Negative Electrode]

The negative electrode 12 includes a belt-shaped negative electrode collector 40 and negative electrode mixture layers 41 formed on two surfaces of the negative electrode collector 40. For the negative electrode collector 40, for example, foil made from a metal, such as copper, stable in a potential range of the negative electrode 12 or a film having a surface layer formed of the metal mentioned above may be used. The negative electrode mixture layer 41 contains a negative electrode active material and a binding agent. The negative electrode 12 can be formed, for example, such that after a negative electrode mixture slurry containing the negative electrode active material, the binding agent, and the like is applied to the negative electrode collector 40, coating films thus formed are dried and then pressed to form the negative electrode mixture layers 41 on the two surfaces of the negative electrode collector 40.

In the negative electrode mixture layer 41, as the negative electrode active material, a silicon compound capable of reversibly occluding and releasing lithium ions is contained. Furthermore, the negative electrode mixture layer 41 preferably contains as the negative electrode active material, a natural graphite, such as a flaky graphite, a massive graphite, or an earthy graphite, or an artificial graphite, such as a massive artificial graphite (MAG) or graphitized mesophase carbon microbeads (MCMB). The content of the silicon compound in the negative electrode mixture layer 41 is with respect to the total mass of the negative electrode active material, for example, 6 to 15 percent by mass and preferably 7 to 10 percent by mass. A mixing ratio of the silicon compound to the graphite is, for example, 6:94 to 15:85 and preferably 7:93 to 10:90.

In addition, for the negative electrode active material, a metal which is not Si and which forms an alloy with lithium, an alloy containing the above metal, or a compound containing the above metal may also be used. When a material, such as lithium titanate, having a low electric conductivity is used as the negative electrode active material, an electrically conductive agent, such as carbon black, may be added to the negative electrode mixture layer 41.

As the silicon compound described above, a silicon oxide represented by $SiO_x$ may be mentioned by way of example. The silicon oxide represented by $SiO_x$ has the structure in which, for example, Si fine particles are dispersed in an amorphous $SiO_2$ matrix. One preferable example of the silicon oxide is $SiO_x$ ($0.5 \leq x \leq 1.6$). A silicon compound represented by $Li_{2y}SiO_{(2+y)}$ ($0 < y < 2$) having the structure in which Si fine particles are dispersed in a lithium silicate phase may also be mentioned by way of example.

On the particle surfaces of the silicon oxide represented by $SiO_x$, electrically conductive films each composed of a material having a high electrical conductivity as compared to that of the silicon oxide are preferably formed. As a constituent material of the electrically conductive film, at least one selected from a carbon material, a metal, and a metal compound may be mentioned by way of example. Among those mentioned above, a carbon material, such as amorphous carbon, is preferable. A carbon film may be formed, for example, by a CVD method using acetylene, methane, or the like, or by a method in which after a coal pitch, a petroleum pitch, a phenol resin, or the like is mixed with $SiO_x$ particles, a heat treatment is performed. In addition, the electrically conductive film may be formed by fixing an electrically conductive filler, such as carbon black, to the particle surfaces of $SiO_x$ using a binding agent. The electrically conductive film is formed, for example, in an amount of 0.5 to 10 percent by mass with respect to the mass of the $SiO_x$ particles.

For the binding agent contained in the negative electrode mixture layer 41, as is the case of the positive electrode 11, for example, a fluorine resin, a PAN, a polyimide resin, an acrylic resin, or a polyolefin resin may be used. When the mixture slurry is prepared using an aqueous solvent, for example, a CMC or its salt, a dispersion of a styrene-butadiene rubber (SBR), a polyacrylic acid (PAA) or its salt, or a poly(vinyl alcohol) is preferably used.

[Separator]

For the separator 13, a porous sheet having an ion permeability and an insulating property may be used. As a particular example of the porous sheet, for example, a fine porous thin film, a woven cloth, or a non-woven cloth may be mentioned. As a material of the separator 13, for example, an olefin resin, such as a polyethylene or a polypropylene, or a cellulose is preferable. The separator 13 may have either a monolayer structure or a multilayer structure. On a surface of the separator 13, for example, a heat resistant layer may also be provided.

[Electrode Body]

The electrode body 14 is a winding type electrode body in which the positive electrode 11 and the negative electrode 12 are spirally wound with the separators 13 interposed therebetween. In order to prevent precipitation of lithium on the surface of the negative electrode 12, the negative electrode 12 is formed one size larger than the positive electrode 11. Hence, a winding-start side end 42 of the negative electrode mixture layer 41 extends to a winding-start end side of the electrode body 14 past a winding-start side end 32 of the positive electrode mixture layer 31. That is, at the winding-start side end portion of the negative electrode 12, a non-facing portion 44 not facing the positive electrode 11 is formed. In addition, although the negative electrode 12 may form a winding-start end of the electrode body 14, in general, a winding-start side end of the separator 13 extends to the winding-start end side of the electrode body 14 past a winding-start side end of the negative electrode 12. That is, the winding-start side end of the separator 13 is located at the winding-start end of the electrode body 14.

In this embodiment, the winding-start side end 32 of the positive electrode mixture layer 31 is located at a winding-start side end of the positive electrode 11, and the winding-start side end 42 of the negative electrode mixture layer 41 is located at the winding-start side end of the negative electrode 12. That is, the winding-start side end 32 of the positive electrode mixture layer 31 coincides with a winding-start side end of the positive electrode collector 30, and the winding-start side end 42 of the negative electrode mixture layer coincides with a winding-start side end of the negative electrode collector 40.

At the winding-start side end portion of the positive electrode 11, an exposed portion at which the positive electrode mixture layer 31 is not formed and at which the surface of the positive electrode collector 30 is exposed may be provided. As is the case described above, an exposed portion may be provided at the winding-start side end portion of the negative electrode 12 at which the surface of the negative electrode collector 40 is exposed. To those exposed portions, electrode tabs may be connected. In addition, even in the case in which the end of the collector does not coincide with the end of the mixture layer, the relationship represented by the following equation 1 is required to be satisfied.

A length Y (mm) of a portion of the negative electrode mixture layer 41 extending from the winding-start side end 32 of the positive electrode mixture layer 31 in a winding direction (circumferential direction) of the electrode body 14 and a rate X (percent by mass) of the silicon compound with respect to the total mass of the negative electrode active material satisfy the relationship of the following Equation 1. The length Y is, in other words, a length of the non-facing portion 44 of the negative electrode 12 in the longitudinal direction.

$$Y \geq 3X - 15 (6 \leq X \leq 15) \quad \text{Equation 1}$$

The length Y is increased as the rate X of the silicon compound is increased and is decreased as the rate Y is decreased. As described above, on a width-direction central portion R of the non-facing portion 44 of the negative electrode 12, a strain stress generated by the difference in volume expansion between the facing portion 43 of the negative electrode mixture layer 41 facing the positive electrode 11 and the non-facing portion 44 of the negative electrode mixture layer 41 not facing the positive electrode 11 is liable to be concentrated. In the nonaqueous electrolyte secondary battery 10, when the length Y is appropriately set in accordance with the rate X based on Equation 1, the strain stress to be applied to the width-direction central portion R of the non-facing portion 44 is efficiently dispersed, and the deformation of the negative electrode 12 can be suppressed.

The relationship represented by Equation 1 is satisfied when the rate X of the silicon compound with respect to the total mass of the negative electrode active material is in a range of 6 to 15 percent by mass. When the rate X is less than 6 percent by mass, even if the length Y is small, the deformation of the negative electrode 12 is not generated. On the other hand, when the rate X is more than 15 percent by mass, even if the length Y is larger than 30 mm, an effect of reducing a stress is decreased with respect to an increase in strain stress, and hence, the deformation of the negative electrode 12 cannot be sufficiently suppressed.

Figure 4:
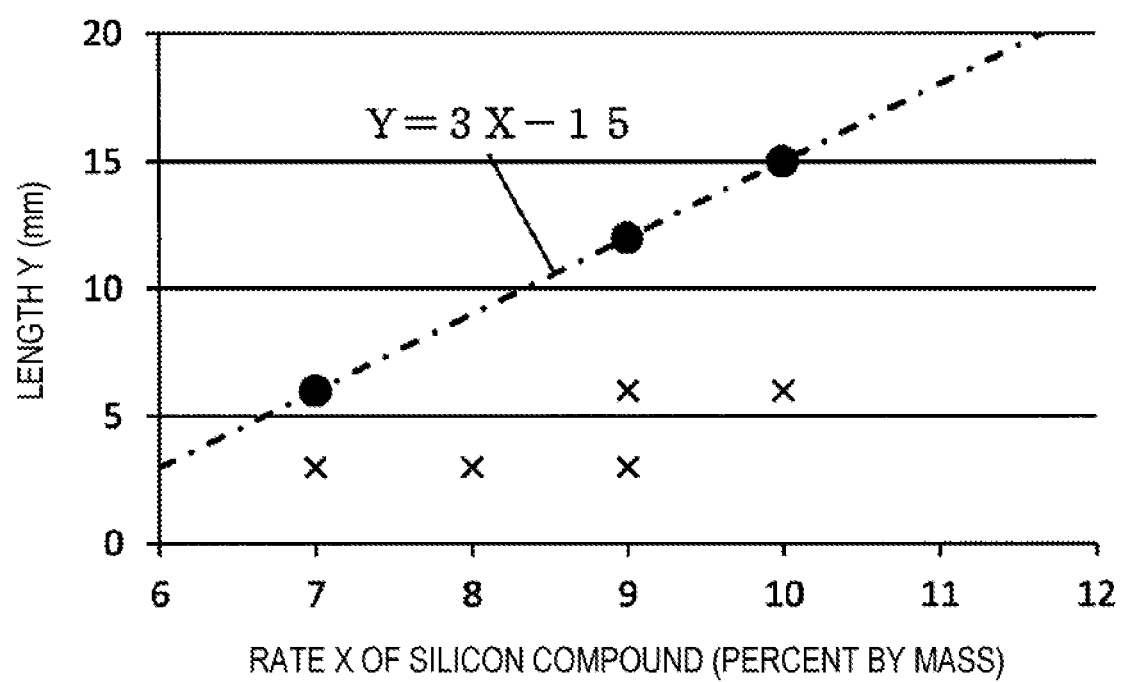
FIG. 4 is a graph showing a relationship between a length Y of a non-facing portion and a rate X of a silicon compound.

FIG. 4 is a graph showing the relationship between the rate X (percent by mass) of the silicon compound along the horizontal axis and the length Y of the non-facing portion 44 along the vertical axis, and the results of the following Examples and Comparative Examples are plotted. Examples in which the deformation of the negative electrode 12 was not confirmed are plotted by ●, and Comparative Examples in which the deformation of the negative electrode 12 was confirmed are plotted by x. As shown in FIG. 4, as the rate X of the silicon compound is increased, although the length Y of the non-facing portion 44 is required to be increased, as long as the length Y of the non-facing portion at least satisfies the relationship of Y=3X−15, the deformation of the negative electrode 12 is suppressed. Hence, when X and Y satisfy the condition of Equation 1: Y≥3X−15 (6≤X≤15), the deformation of the negative electrode 12 is suppressed. Equation 1 defines approximately the minimum necessary length Y of the non-facing portion 44, and the upper value of Y may be arbitrarily determined in accordance with a design capacity of the battery or the like.

Example 1

Hereinafter, although the present disclosure will be further described with reference to Examples, the present disclosure is not limited to the following Examples.

Example 1

[Synthesis of Positive Electrode Active Material]

After lithium hydroxide and a nickel composite oxide represented by $Ni_{0.82}Co_{0.15}Al_{0.03}O_2$ were mixed together so that a rate of the number of moles of Li with respect to the number of total moles of metal elements of the above composite oxide was 1.015, firing was performed in an oxygen atmosphere, so that a lithium nickel composite oxide (positive electrode active material) represented by $LiNi_{0.82}Co_{0.15}Al_{0.03}O_2$ was synthesized.

[Formation of Positive Electrode]

After 100 parts by mass of the positive electrode active material, 1 part by mass of acetylene black, and 0.9 parts by mass of a poly(vinylidene fluoride) were mixed together, an appropriate amount of N-methyl-2-pyrrolidone was added, so that a positive electrode mixture slurry was prepared. Subsequently, this positive electrode mixture slurry was applied on two surfaces of a long positive electrode collector formed of aluminum foil having a thickness of 15 μm by a doctor blade method, and coating films thus formed were then dried. After the dried coating films were pressed using a roller machine, cutting was performed to obtain a predetermined electrode size, so that a positive electrode in which positive electrode mixture layers were formed on the two surfaces of the positive electrode collector was formed. At a central portion of the positive electrode in a longitudinal direction thereof, an exposed portion at which the mixture layers were not present and at which the collector surface was exposed was provided, and an aluminum-made positive electrode tab was welded to the exposed portion.

[Formation of Negative Electrode]

After 93 parts by mass of a graphite powder, 7 parts by mass of particles of a silicon oxide represented by SiO ($SiO_x$, x=1), the surfaces of the particles each being provided with a carbon film, 1.5 parts by mass of a sodium carboxymethyl cellulose, and 1 part by mass of a dispersion of a styrene-butadiene rubber were mixed together, an appropriate amount of water was added, so that a negative electrode mixture slurry was prepared. Subsequently, the negative electrode mixture slurry was applied on two surfaces of a long negative electrode collector formed of copper foil having a thickness of 8 μm, and coating films thus formed were then dried. After the dried coating films were pressed using a roller machine, cutting was performed to obtain a predetermined electrode size, so that a negative electrode in which negative electrode mixture layers were formed on the two surfaces of the negative electrode collector was formed. An exposed portion at which the mixture layers were not present and at which the collector surface was exposed was provided at one end portion (end portion located at a winding-finish side of an electrode body) of the negative electrode in a longitudinal direction thereof, and a nickel-made negative electrode tab was welded to the exposed portion.

The silicon oxide particles on which the carbon films were provided could be obtained by the following method.

First, by a CVD method using a hydrocarbon-based gas, carbon films were formed on the surfaces of the particles of a silicon oxide having a SiO composition. Subsequently, the SiO particles on which the carbon films were formed were heated at 1,000° C. in an argon atmosphere to perform a disproportionation reaction, so that a Si phase and a $SiO_2$ phase were formed in the SiO particles. The particles described above were classified, so that a silicon oxide to be used for a negative electrode active material was obtained.

[Formation of Electrode Body]

After the above positive electrode and the above negative electrode were spirally wound around a winding core (diameter: 3.3ϕ) with separators each formed of a polyethylene-made fine porous film interposed therebetween, the winding core was removed, so that a winding type electrode body was formed. In this step, the positive electrode, the negative electrode, and the separators were spirally wound around the winding core so that the negative electrode extended from a winding-start side end of the positive electrode to have a length Y (length Y of a non-facing portion) of 6 mm from a winding-start side end of the positive electrode mixture layer to a winding-start side end of the negative electrode mixture layer.

[Preparation of Nonaqueous Electrolyte Solution]

In a mixed solvent in which ethylene carbonate (EC) and dimethyl carbonate (DMC) were mixed together at a volume ratio of 25/75 (at one atmospheric pressure and 25° C.), $LiPF_6$ was dissolved to obtain a concentration of 1 mol/L, so that a nonaqueous electrolyte solution was prepared.

[Formation of Nonaqueous Electrolyte Secondary Battery]

The winding type electrode body was inserted in a cylindrical iron-made exterior package can. After a welding rod was inserted in a hollow portion of the electrode body which was formed after the winding core was removed and was brought into contact with the negative electrode tab, the negative electrode tab was resistance-welded to an inner surface of a bottom portion of the exterior package can. After the nonaqueous electrolyte liquid was charged in the exterior package can, the positive electrode tab was welded to a sealing body, and an opening portion of the exterior package can was sealed by the sealing body, so that a cylindrical nonaqueous electrolyte secondary battery having a diameter of 18 mm and a height of 65 mm was formed.

[Initial Chare/Discharge of Battery]

The battery described above was charged at a constant current of 0.3 It until a battery voltage reached 4.2 V and was further charged at a constant voltage of 4.2 V until a current reached 0.02 It. After the charge, the battery was discharged at a constant current of 0.5 It until the battery voltage reached 2.5 V. The initial charge/discharge was performed at room temperature.

[Observation of Negative Electrode]

After the battery processed by the above initial charge/discharge was charged under the same charge conditions as those of the initial charge/discharge, the charged battery was disassembled, and the negative electrode was recovered. A winding-start side end portion of the negative electrode thus recovered and the vicinity thereof were observed by visual inspection, and the presence or absence of the deformation was evaluated. The evaluation results are shown in Table 1.

Examples 2 and 3, Comparative Examples 1 to 5

Except for that the content (percent by mass) of the silicon oxide with respect to the negative electrode active material and the length Y from the winding-start side end of the positive electrode to a winding-start side end of the negative electrode were changed to the values shown in Table 1, a nonaqueous electrolyte secondary battery was formed in a manner similar to that of Example 1. In addition, the performance evaluation was also performed in a manner similar to that of Example 1.

TABLE 1

| | RATE X (wt %) | LENGTH Y (mm) | DEFORMATION OF NEGATIVE ELECTRODE |
|---|---|---|---|
| EXAMPLE 1 | 7 | 6 | NO |
| EXAMPLE 2 | 9 | 12 | NO |
| EXAMPLE 3 | 10 | 15 | NO |
| COMPARATIVE EXAMPLE 1 | 7 | 3 | YES |
| COMPARATIVE EXAMPLE 2 | 8 | 3 | YES |
| COMPARATIVE EXAMPLE 3 | 9 | 3 | YES |
| COMPARATIVE EXAMPLE 4 | 9 | 6 | YES |
| COMPARATIVE EXAMPLE 5 | 10 | 6 | YES |

As shown in Table 1 and FIG. 4, in the negative electrode of each of Comparative Examples 1 to 5 in which the condition of Equation 1: Y≥3X−15 was not satisfied, crack lines (deformation) were confirmed in the negative electrode mixture layer at a width-direction central portion of the non-facing portion. It is believed that this deformation is generated such that a strain stress is applied to the negative electrode due to a large volume expansion of the silicon compound, and this stress is concentrated on the width-direction central portion of the non-facing portion. As described above, at the facing portion of the negative electrode, although the negative electrode mixture layer is volume-expanded by charge, the negative electrode mixture layer at the non-facing portion is not volume-expanded by charge, and hence, it is supposed that the non-facing portion is pulled by the stress of the facing portion, and a large strain stress is applied to the width-direction central portion of the non-facing portion.

On the other hand, in the negative electrode of each of Examples 1 to 3 in which the condition of Equation 1 was satisfied, at the non-facing portion and the vicinity thereof, the deformation, such as crack lines, was not confirmed. Since the condition of Equation 1 was satisfied, it is believed that a strain stress to be applied to the non-facing portion of the negative electrode is dispersed, and hence, the deformation of the negative electrode is suppressed.

REFERENCE SIGNS LIST

10 nonaqueous electrolyte secondary battery, 11 positive electrode, 12 negative electrode, 13 separator, 14 electrode body, 15 battery case, 16 exterior package can, 17 sealing body, 18, 19 insulating plate, 20 positive electrode tab, 21 negative electrode tab, 22 groove portion, 23 filter, 24 lower valve, 25 insulating member, 26 upper valve, 27 cap, 28 gasket, 30 positive electrode collector, 31 positive electrode mixture layer, 32, 42 winding-start side end, 40 negative electrode collector, 41 negative electrode mixture layer, 43 facing portion, 44 non-facing portion

The invention claimed is:

1. A nonaqueous electrolyte secondary battery comprising: a winding type electrode body in which a positive electrode including a positive electrode mixture layer and a negative electrode including a negative electrode mixture layer are spirally wound with at least one separator interposed therebetween, wherein in the negative electrode mixture layer, a silicon compound and graphite are contained as a negative electrode active material, a winding-start side end of the negative electrode mixture layer extends to a winding-start end side of the electrode body past a winding-start side end of the positive electrode mixture layer, and a length Y, in mm, of a portion of the negative electrode mixture layer extending from the winding-start side end of the positive electrode mixture layer and a rate X, in percent by mass, of the silicon compound with respect to the total mass of the negative electrode active material satisfy a relationship of $Y \geq 3X-15$ where $6 \leq X \leq 15$.

2. The nonaqueous electrolyte secondary battery according to claim 1, wherein the winding-start side end of the positive electrode mixture layer is located at a winding-start side end of the positive electrode, and the winding-start side end of the negative electrode mixture layer is located at a winding-start side end of the negative electrode.

* * * * *